United States Patent [19]

Farina et al.

[11] Patent Number: 5,061,931

[45] Date of Patent: Oct. 29, 1991

[54] RECURSIVE SYSTEM FOR IMAGE FORMING BY MEANS OF A SPOTLIGHT SYNTHETIC APERTURE RADAR

[75] Inventors: Alfonso Farina, Rome; Carlo F. Morabito, Cannitello, both of Italy

[73] Assignee: Selenia Industrie Elettroniche Associate S.p.A., Rome, Italy

[21] Appl. No.: 557,309

[22] Filed: Jul. 23, 1990

[51] Int. Cl.$^5$ .............................................. G01S 13/00
[52] U.S. Cl. ....................................................... 342/25
[58] Field of Search ........................................... 342/25

[56] References Cited

PUBLICATIONS

Munson et al., "A Tomographic Formulation of Spotlight-Mode Synthetic Aperture Radar", Proc. IEEE, vol. 71, No. 8, 1983.

*Primary Examiner*—Mark Hellner
*Attorney, Agent, or Firm*—Cohen, Pontani & Lieberman

[57] ABSTRACT

Recursive system for the forming of a radar image by means of a SAR sensor, for application preferably related to the radar field, essentially having a monodimensional transformation system (1) of the signal received by the radar; a convolution element (2) of the same signal by means of a monodimensional inverse transformation (3). The result of the convolution is retroprojected by means of element (4). In turn, the result of this operation, envelope-detected (5), provides an estimate of the electromagnetic characteristics of the teledetected scene. The invention belongs to the radar application field, and more precisely to that of synthetic aperture radars for teledetection. It finds its best application in the area of synthetic aperture radar signal processing.

2 Claims, 3 Drawing Sheets

RECURSIVE SYSTEM FOR IMAGE FORMING BY MEANS OF A SPOTLIGHT SYNTHETIC APERTURE RADAR

FIELD OF THE INVENTION

The instant invention relates to a system for the processing of signals involved in a synthetic aperture radar ("SAR") system and specifically such a system operating in Spotlight mode. Even more specifically, the instant invention relates to the imaging radar digital signal processing field and to the capacity to regenerate a reflectivity map as a function of space coordinates of an extended scene such as the Earth surface, or an object of limited dimensions such as a vehicle moving on the Earth or an aircraft flying at a given distance from the Earth surface.

BACKGROUND OF THE INVENTION

SAR processing systems present advantages compared to state of the art systems, with respect to quality of the image obtained, ability to generate the image in a recursive manner with increasing resolution, and efficiency of the processing structure.

Imaging radar theory is based upon the concept of a synthetic aperture, and is extensively described in Asherman, D. et al. "Developments in radar imaging" IEEE Transactions on Aerospace and Electronic systems, Vol. AES-20, N4, July 1984, p. 363. A scene can be teledetected by a set of electromagnetic pulses transmitted by an airborne or a satellite borne radar. By means of suitable processing of the signals received by the radar, due to the scattering effect of the scene it is possible to reconstruct an electromagnetic reflectivity map as a function of space coordinates in a suitable reference system which contains the scene and the motion of the radar. The Asherman et al. article also introduces a spotlight operating mode.

In another reference, a paper by Munson, D.C. et al. entitled "A Tomographic Formulation of Spotlight Mode Synthetic Aperture Radar oc." IEEE, Vol. 71 Aug. 1983, pp. 917/925, a method for the processing of a signal is presented. In FIG. 7 in this paper, the processing of the signal received by the radar is performed after analogue to digital conversion along the following three processing steps: (i) interpolation of the data received and set on a polar grid so as to form new data on a cartesian plane; (ii) bidimensional inverse transform of data by means of the Fast Fourier Transform (FFT); and (iii) Extraction of the modules and display.

However, a system of the kind taught by Munson, et al. suffers the following drawbacks. First, it is impossible to obtain a high resolution image of sufficiently high quality. High resolution implies data acquisition over a wide radar observation angle. Therefore, the polar grid, which hosts the data to be processed, is quite different than the Cartesian grid onto which the data is interpolated. The interpolation error which arises introduces a deformation and defocusing on the final image. Second, the Munson et al. system possesses a high processing load due to the polar-Cartesian interpolation and to the bidimensional transformation. The number of multiplications required by the overall algorithm is proportional to $N^4$, with N equal to the number of data sets on the polar grid. Lastly, the image scene is presented only upon completion of the acquisition of all data by the radar.

It is thus an object of the present invention to provide a radar antenna that radiates a beam which is continuously pointed onto a limited portion of the scene, despite the movement of the radar itself.

It is a further object of the present invention to provide a system that provides high resolution due to the illumination time of the radar towards a limited portion of the scene.

It is still a further object of the instant invention to provide a new processing apparatus that eliminates the drawbacks possessed by the Munson, et al. system, as described above.

SUMMARY OF THE INVENTION

The foregoing objects, and other objects of the instant invention are achieved by the provision of a revised signal processing device for forming an image of a teledetected scene from a radar signal through use of a synthetic aperture radar in spotlight mode, having means for receiving the radar signal, monodimensional transformation element means for acting upon the radar signal in accordance with a monodimensional FFT algorithm for producing a first processed signal, inverse monodimensional transformation element means for acting upon said radar signal in accordance with an inverse monodimensional FFT algorithm for producing a second processed signal, condition means for convoluting said first and said second processed signals together for producing a third processed signal, retroprojection means for performing a retroprojection integration of said third processed signal for producing a fourth processed signal, and envelope detection means for extracting a module of an estimated reflectivity function from said fourth processed signal for providing an estimate of the electromagnetic characteristics of the teledetected scene. The system provides an image which has high resolution and high quality. The processing load of the algorithm adopted is of the order of $N^2 \log N$. The image is furthermore obtained in a recursive manner, i.e. as data is acquired by the radar, without waiting for completion of the entire data set. This results in a sensor which provides images having a quality which increases in real time.

BRIEF DESCRIPTION OF THE DRAWINGS

Other objects and many of the attendant advantages and features of the present invention will be readily appreciated and better understood by reference to, and consideration of the detailed description of the invention together with the accompanying drawings wherein like reference numerals designate like parts throughout the figures thereof, and wherein.

DETAILED DESCRIPTION OF THE INVENTION

Figure 1:
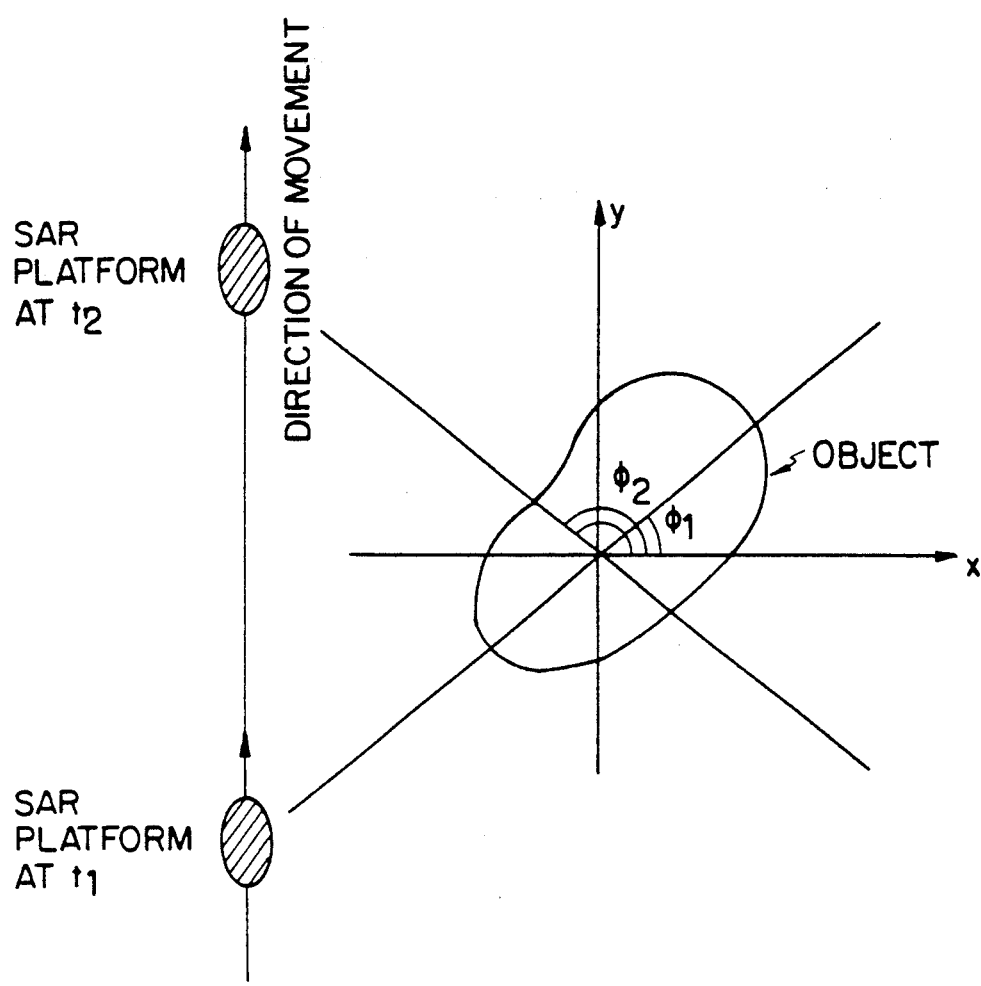
FIG. 1 shows the geometry of target teledetection by means of a Spotlight SAR.

FIG. 1 shows the geometry of a teledetection process of a target by means of a Synthetic Aperture Radar ("SAR") operating in Spotlight mode. The Radar data is collected at times $t_1$ and $t_2$, i.e. under an angle which varies between $\phi_1$ and $\phi_2$.

Figure 2:
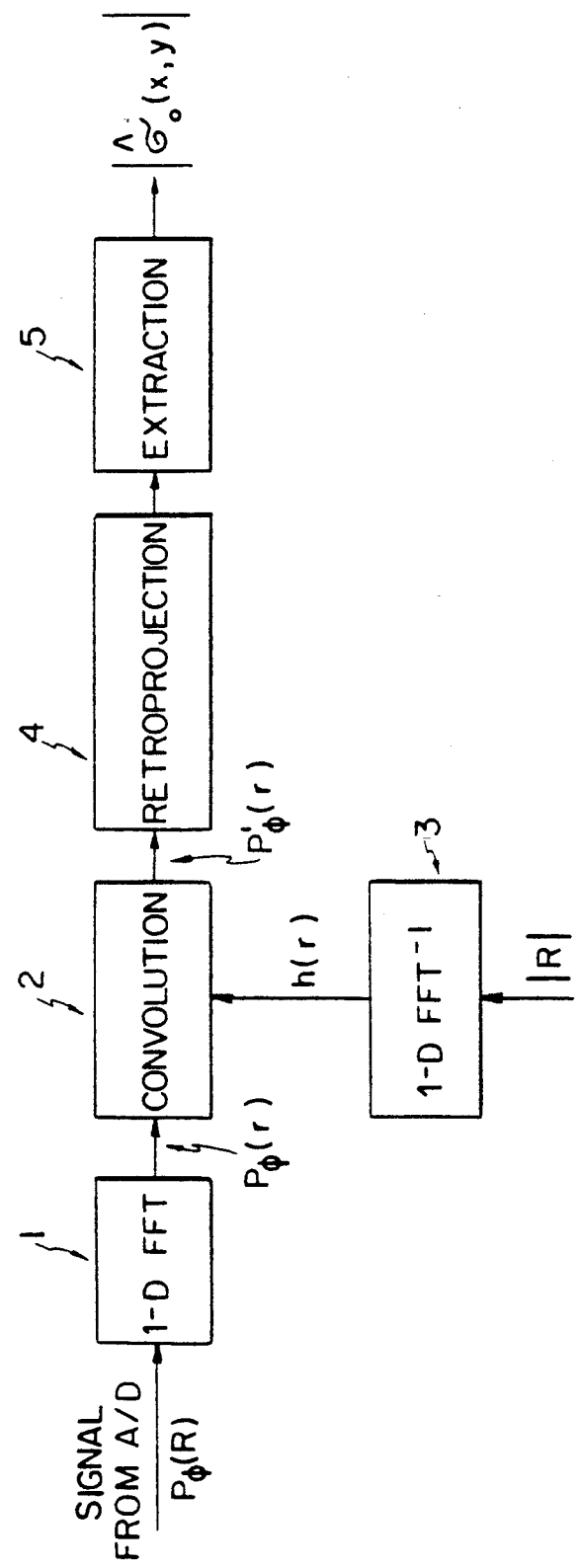
FIG. 2 shows the operating principle of a Spotlight SAR processor in accordance with the instant invention.

FIG. 2 shows monodimensional transformation element 1 by means of FFT algorithm; convolution processing element 2; monodimensional processing element 3 for FFT inverse transform; processing element 4 for retroprojection of the input signal; and input signal envelope extractor processing element 5. This schematic is an application which follows in accordance with equation (3) which is an original interpretation of the well-known expression (1), all shown below.

Figure 3:
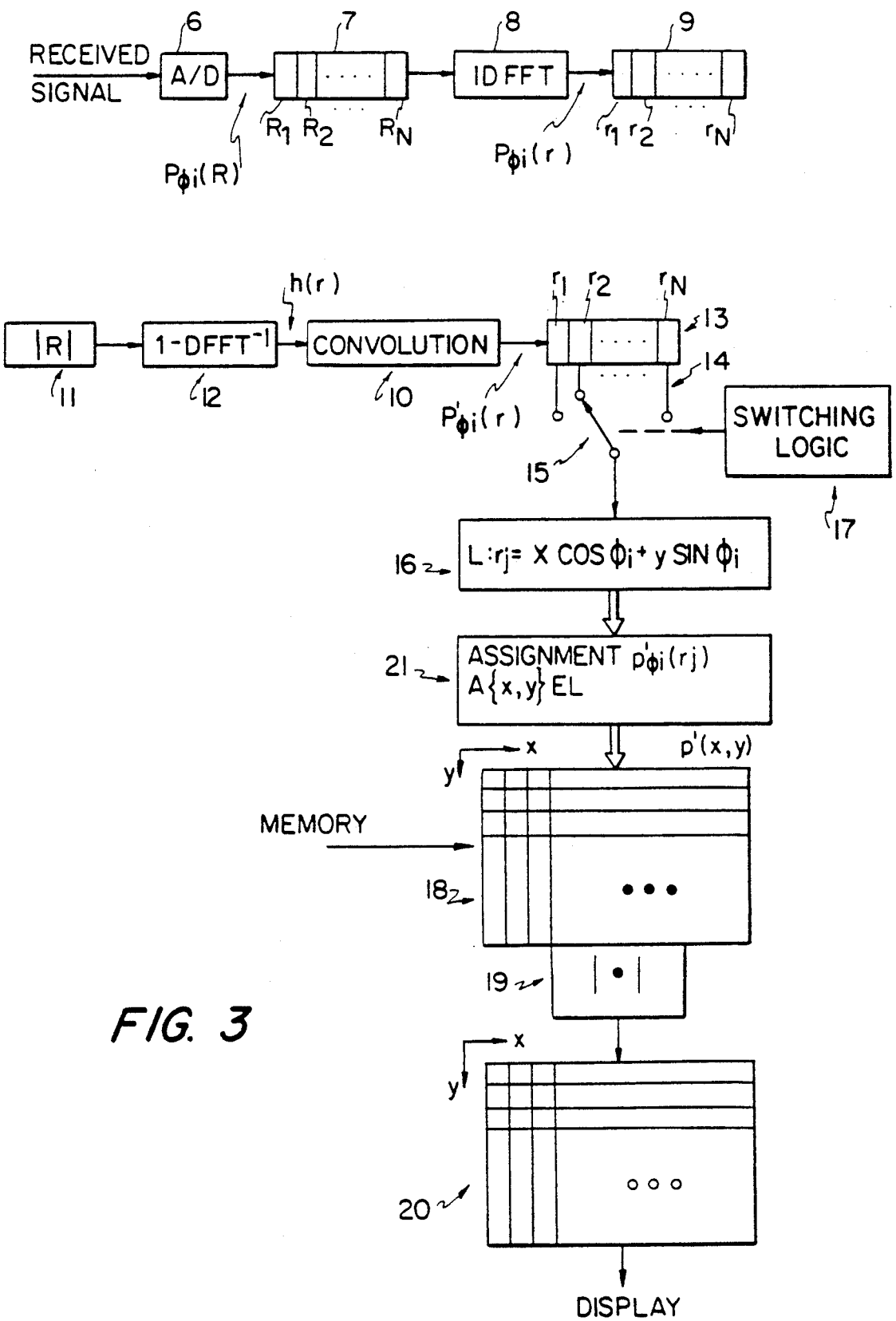
FIG. 3 is a block diagram schematic of the instant invention in accordance with a preferred embodiment.

FIG. 3 shows analogue to digital converter 6 for conversion of a signal received by the radar; shift registers 7, 9 and 13; dedicated hardware 8 for FFT monodimensional operation hardware 10 dedicated to convolutional operations; look up table memory 11; hardware 12 dedicated to inverse monodimensional FFT processing; access 14 to memory positions of the shift register; switch 15; transforming element 16 of Cartesian-polar coordinates; assignment block 21; switching logic element 17; memories 18 and 20; and envelope extractor 19.

It is assumed that the radar transmits a pulse burst, each pulse coded by means of a linear frequency shift (CHIRP). The target reflectivity map is indicated as delta zero $(X,Y)^1$. The bidimensional Fourier Transform of the original reflectivity function Delta zero $(X,Y)^2$ is indicated as Sigma zero $(\ldots)^3$; Rho $(r, Phi)^4$ indicates the projection of the reflectivity function Delta zero $(x,y)^5$ along the viewing angle $Phi^6$ and with P Phi $(.)^7$ the corresponding Fourier transform. A fundamental result, due to the teachings of Munson et al. cited above, is given by the following formula which ties the Fourier transform of the projection of the reflectivity function to the bidimensional transform of the reflectivity itself:

$$P\phi(R) = \Sigma_0(R \cos \phi, R \sin \phi)$$

$$P\,Phi(R) = Sigma\,zero\,(R\,cos\,Phi, R\,sin\,Phi) \quad (1)$$

where R is the radial coordinate on the Fourier Transform plane.
1 $\delta_0(X,Y)$
2 $\delta_0$
3 $\Sigma_0(.\,,.)$
4 $\rho(r, \phi)$
5 $\delta_0(X,Y)$
6 $\phi$
7 $P\phi(.)$ Equation (1) is the starting point from which the processing system presented herein originates. The scheme proposed by Munson et al. acts upon data making them pass through three presentation domains:

|  | {P..Phi} | Natural domain where radar data is received by |
|---|---|---|
|  | {P..$\phi$} | the radar sensor; |
| interpolation ↓ |  |  |
|  | (X,Y) | Cartesian coordinates in the transform domain; |
| 2D interpolation ↓ |  |  |

The schematic, treated herein, recognizes the original data as monodimensional transforms of a projection, which makes possible representing the reflectivity map in the physical domain X,Y by means of a simple retroprojection operation:

| {R,Φ} {R, phi} | natural domain of the signals received; |
|---|---|
| ↓ 1-d transformation |  |
| {r,$\phi$} {r, Phi} | normal coordinates in the physical domain |

| -continued |  |
|---|---|
| 2-D retrospection |  |
|  | of the reflectivity map. |
|  | (X,Y) Cartesian coordinates in the reflectivity map physical domain. |

The mathematical theory through which the processing system of this invention may be implemented is the following:

Equation (1) provides the following expression for an estimate of the reflectivity map:

$$\sigma_0(x,y) = \qquad (2)$$

$$\int_0^\pi d\phi \int_{-\infty}^\infty P_\phi(R)|R|\exp\{j2\pi R(x\cos\phi + y\sin\phi)\}dR$$

Equation (2) may be rewritten as:

$$\sigma_0(x,y) = \int_0^\pi \mathcal{F}^{-1}\{P_\phi(R)|R|\}d\phi = \qquad (3)$$

$$= \int_0^\pi [\rho(R,\phi) * \mathcal{F}^{-1}\{|R|\}]d\phi = \int_0^\pi p'(r,\phi)d$$

Where $F-1(.)^8$ $\mathcal{F}^{-1}\{.\}$ is the inverse Fourier transform and '*' is the convolution operation. The processing scheme, based upon equation (3) is shown in FIG. 2.
8 $\mathcal{F}^{-1}\{.\}$ The signals which are received by the analogue to digital converter are samples of function P Phi $(R)^9$. For different values of the pair of variables $Phi^{10}$ and R, block 1 performs a Fast Fourier Transform in a single dimension, so as to provide at its output projection Rho Phi$(r)^{11}$. Block 2 performs a convolution between this function and a purposely developed function h(r), which is obtained from block 3 which performs a single dimension inverse of function $|R|$. At the convolution output we find Rho' Phi(r). Block 4 thereafter performs the retroprojection action, i.e. the integration of Rho' Phi$(r)^{12}$ in variable Phi over the interval (O.Pi) (O.$\pi$). The final image is obtained by extracting the modules of the estimated reflectivity function as a function of Cartesian coordinates (x,y) starting from normal coordinates (r.Phi). (r.$\phi$).
9 $P\phi(R)$
10 $\phi$
11 $\rho_\phi(r)$
12 $\rho'_\phi(r)$ It should be noted that the schematic of FIG. 2 gives way to further variants corresponding to the adoption of functions which are different than $|R|$ used at the input of block 3. This has the purpose of improving the implementation of the filter function h(r) and highlighting particular aspects of image/delta zero (x,y)/. * $|\delta_0(x,y)|$ FIG. 3 shows a preferred implementation scheme of the system of the instant invention. Clearly, radar experts may derive different schemes than that of FIG. 3, but all are based upon the original principles detailed in the present invention. Such schemes derived should be considered as further implementations of the principles shown in FIG. 2 and therefore within the scope of the instant invention.

As shown in FIG. 3, the signal received by the analogue to digital converter 6, when the radar antenna is pointing onto the target with an angle Phi i,$^{13}$ forms a string of samples of signal P related to angle Phi i[14] and when R takes the N values R1, R2, ... Rn, the N samples of P Phi (R)[15] are saved in register 7. Thereafter such samples are transformed by means of block 8, which implements the 1−D operation by means of standard techniques. The resulting signal Rho Phi(r)[16] is loaded into another register and then sent to block 10 which performs convolution. The convolution operation is also implemented by means of standard devices which adopt shift registers and accumulators.

[13] $\phi_i$
[14] $\phi_1$
[15] $P_\phi(R)$
[16] $\rho_\phi(r)$

Signal Rho Phi i (r)[17] is then convoluted with signal h(r) obtained from blocks 11 and 12. Block 11 is a look-up table which reports the numeric values of |R| in table form. The result of the convolution operation Rho'Phi(r)[18] is stored in the shift register 13. Each cell of this register is now accessible sequentially through connecting lines 14 and switch 15. The contents of this cell are sent to block 16. Switch 15 is controlled by block 17, which operates according to a cabled logic. Block 16 calculates the equation in Cartesian coordinates (x,y), which are the physical coordinates of the plane of the target, of the line defined as:

$$l: r_j = x\cos\phi_i + y\sin\phi_i \quad (4)$$

$$j \in \lambda, \ldots, N$$

$$i \in \lambda, \ldots, M$$

[17] $\rho_{\phi i}(r)$
[18] $\rho'_\phi(r)$

Block 21 assigns the value of function Rho'Phi i(r zero)[19] to all points having coordinates (x,y) belonging to each line of data. Blocks 16 and 21 can be conveniently implemented by means of microprogrammable integrated circuits. Such values load the corresponding cells of memory matrix 18. This memory matrix is structured in lines and columns according to the coordinates axes (x,y) of the target plane. The dimensions of such matrix depend upon the dimensions of the scene to be teledetected and upon the depth of field of the sensor. Processing is concluded by extracting at envelope extractor 19 the modules of the contents of each cell of the matrix 18 and by loading the result in a cell corresponding to a new matrix having the same size as previous 18. The contents of matrix 20 may be sent to a display device.

[19] $\rho'_{\phi i}(r_0)$

It should be noted that a device may be inserted between block 21 and 18 with the task of interpolating function $p'(r_1)$, $p(r_2)$, $p(r_n)$ to obtain a new set of N values $p'(r_1^*)$, $p'(r_2^*)$, ... $p'(r_{n-1})$, starting from measured data $p'(r_1)$, .... The new values Rho'(r*)[20] are selected so as to minimize the mean square differences between line 1 and its approximation $$\{p'(r_i^*), i=1, \ldots N\}$$

[20] $\rho'(r^*)$

This unidimensional interpolation is much less cumbersome in terms of processing requirements than the bidimensional processing between polar and Cartesian grids, performed in present state of the art systems.

As soon as the radar provides a new set of signals P phi k(R)[21] relevant to new observation angle Phi k,[22] the entire processing from block 7 to block 21 is repeated. The new signal Rho'(x,y)[23] obtained from block 21 is now cumulated coherently with the preceding contained in memory 18. It follows that the final image is reconstructed in a recursive manner while the radar scans the target under different view angles.

[21] $P_{\phi k}(R)$
[22] $\phi_k$
[23] $\rho'(x,y)$

We claim:

1. A recursive signal processing device for forming an image of a teledetected scene from a radar signal through use of synthetic aperture radar signal in spotlight mode, comprising:
   means for receiving said radar signal;
   monodimensional transformation element means for acting upon said radar signal in accordance with a monodimensional FFT algorithm for producing a first processed signal;
   inverse monodimensional transformation element means for acting upon said radar signal in accordance with an inverse monodimensional FFT algorithm for producing a second processed signal;
   convolution means for convoluting said first and said second processed signals together to produce a third processed signal;
   retroprojection means for performing a retroprojection integration of said third processed signal to produce a fourth processed signal; and
   envelope detection means for extracting a module of an estimated reflectivity function from said fourth processed signal for providing an estimate of the electromagnetic characteristics of said teledetected scene.

2. A recursive signal processing device for forming an image of a teledetected scene from a radar signal through use of synthetic aperture radar in spotlight mode, comprising:
   means for receiving an analog radar signal;
   an a/d converter for converting the form of said received analog radar signal into a first digital signal;
   a first shift register for receiving said first digital signal from said a/d converter and storing said digital signal as a first stored digital signal;
   first transforming means for transforming said first digital signal into a first processed signal by acting upon said first digital signal in accordance with a monodimensional FFT algorithm;
   a second shift register for receiving said first processed signal from said transforming means and storing said first processed signal as a first processed stored signal;
   look-up table means for generating a second digital signal;
   transforming means for transforming said second digital signal into a second processed signal by acting upon said second digital signal in accordance with an inverse monodimensional FFT algorithm;
   convolution means for taking said first and said second processed signals and convoluting them together to produce a third processed signal;
   a third shift register for receiving said third processed signal from said convolution means and storing said third processed signal as a third processed stored signal;
   switching means for manipulating each of said first, second and third processed stored signals in accordance with switching logic means and coordinate transformer means, and producing an output;
a multiplicity of memory elements for receiving and storing said output as data;
envelope extraction means for extracting data from said memory elements which is a function of the teledetected image; and
recording means for receiving and recording said extracted data.

* * * * *